(12) United States Patent
Kubota

(10) Patent No.: US 6,321,434 B1
(45) Date of Patent: Nov. 27, 2001

(54) METHOD FOR MANUFACTURING SEALING TOOL

(75) Inventor: Mikio Kubota, Tokyo (JP)

(73) Assignee: Toska Co., Ltd., Tokyo (JP)

(*) Notice: Subject to any disclaimer, the term of this patent is extended or adjusted under 35 U.S.C. 154(b) by 0 days.

(21) Appl. No.: 09/526,744

(22) Filed: Mar. 16, 2000

(51) Int. Cl.⁷ ..................................................... B23P 17/00
(52) U.S. Cl. ..................... 29/425; 29/527.1; 29/527.3; 29/530; 264/251; 264/254; 264/255; 264/152
(58) Field of Search ............................ 29/425, 426.4, 29/522.1, 527.1, 527.3, 530; 264/251, 254, 255, 152

(56) References Cited

U.S. PATENT DOCUMENTS 4,636,347 * 1/1987 Kato ....................................... 264/251

* cited by examiner

Primary Examiner—S. Thomas Hughes
Assistant Examiner—John C. Hong
(74) Attorney, Agent, or Firm—Arent Fox Kintner Plotkin & Kahn, PLLC

(57) ABSTRACT

A method for manufacturing sealing tool comprising a socket (3) and a head (4) at one end and the other end of a linear element (2) respectively and a protrusion (11) for locking the head (4) in a head-insertion hole (10) of the socket (3), which comprises the steps in the mentioned sequence of fixing a core ball (13) and either the socket (3) or the head (4) to the linear element (2), cutting the linear element (2) at a point close to the core ball (13), pulling the linear element (2) to bring the core ball (13) to be set in a cavity (27) and filing a synthetic resin in the cavity (27) in a manner such that the core ball (13) and the socket (3) engageable with the head (4) are integrally formed.

3 Claims, 7 Drawing Sheets

METHOD FOR MANUFACTURING SEALING TOOL

BACKGROUND OF THE INVENTION

1. Field of the Invention

The invention relates to a method for manufacturing a sealing tool which has a socket at one end of its linear element and a head at its other end, and also which is provided with a protrusion for engaging the head into a head-insertion hole of the socket.

2. Description of the Prior Art

Conventionally, when manufacturing a sealing tool which has respectively a socket at one end of its thread strip and a head at the other end and also which is provided with a protrusion for engaging the head in a head-insertion hole of the socket, a part of the thread strip traversing in a socket-molding cavity, i.e. the thread strip positioned in the socket hole has been cut off though a cut-off portion of a piston-type movable mold (see Japanese patent application Kokai publication No. 60-2458).

However, if the thread strip traversing in the socket hole remains therein without cutting off, the remaining part of the thread strip acts as an obstacle, making it impossible to insert the head into the socket hole.

Moreover, according to this prior art, after the thread strip to which the socket and the head are fixed is once wound around a bobbin, while rewinding the thread strip from the bobbin the thread strip is cut off between the socket and the head in order to manufacture the seating tool, thus taking much time to resultantly make it impossible to manufacture the sealing tool efficiently.

BRIEF SUMMARY OF THE INVENTION

In view of the above problems, it is an object of the present invention to provide a method for manufacturing a sealing tool with a high quality of which the linear element does not protrude into the head-insertion hole.

The method for manufacturing such a sealing tool according to the invention that has respectively a socket at one end of its linear element and a head at the other end and also that is provided with a protrusion for engaging the head in a head-insertion hole of the socket comprises the steps of: fixing a core ball and either one of the above-mentioned socket or the above-mentioned head to the above-mentioned linear element; cutting off the above-mentioned linear element at a position near the above-mentioned core ball; setting the above-mentioned core ball into a cavity while drawing out the above-mentioned linear element; filling synthetic resin into the above-mentioned cavity, to double-mold a member connectable with another member molded together with the above-mentioned core ball in such a manner that the former member may include the above-mentioned core ball.

Thus, after fixing the core ball and either one of the socket and the head to the linear element, that linear element is cut off at a position near the core ball to grip the core ball with a gripping portion of a carrier robot etc. in order to set the core ball in the cavity while drawing the linear element out of a reel etc. Then, synthetic resin may be filled in the cavity to double-mold a member (e.g., a socket in the case where the core ball and the head are formed together) connectable with another member molded together with the core ball so as to include the core ball, thus preventing the linear element from protruding into the head-insertion hole. As a result, it is possible to manufacture a high-quality sealing tool efficiently.

Moreover, according to the present invention, by fixing a plurality of core balls at one end of a linear element, the core ball positioned at the top can act as a member for stopping the other core balls from being extracted, thus preventing them from falling out.

Further also, according to the present invention, by utilizing the core ball as a gripped portion of a linear element draw-out means, the core ball can be automatically transported into a cavity for molding the socket or the head.

This core ball has a function of carrying the linear element to a predetermined position by using a gripping portion of a carrier robot etc., a function of fixing a tip of the linear element in the mold cavity, and a function of fixing a piece made of synthetic-resin at the end of the linear element to fill the cavity with necessary resin in order to mold, so-called double-mold, a predetermined molding product.

DETAILED DESCRIPTION OF THE INVENTION

The following will describe embodiments of the invention with reference to the drawings.

Figure 1:
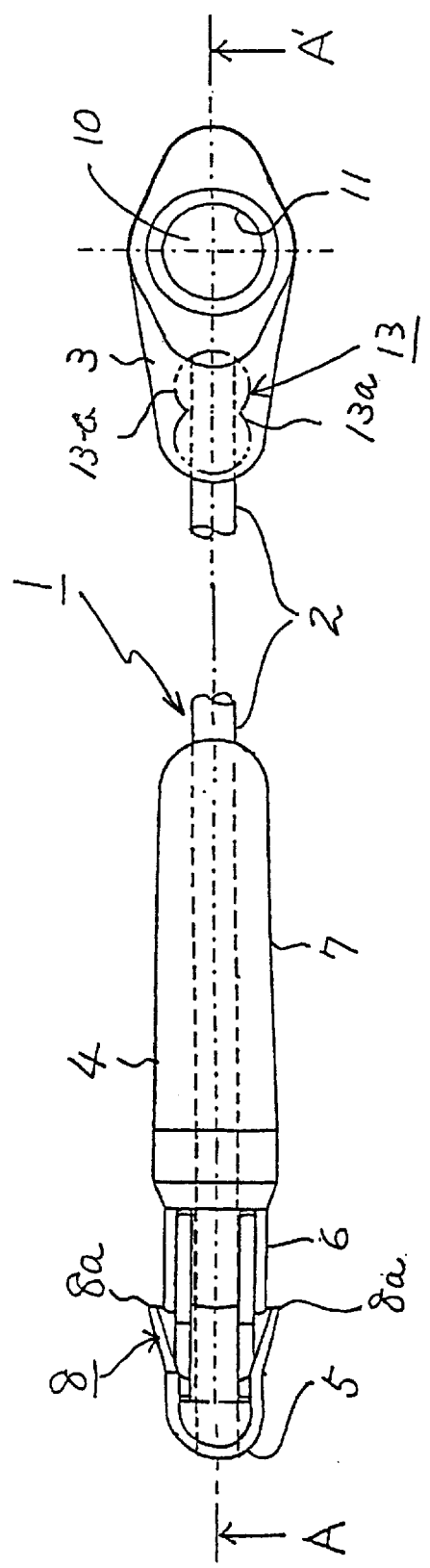
FIG. 1 is a plan view of a sealing tool molded according to a method of the present invention.

As shown in FIG. 1, a sealing tool 1 has respectively a socket 3 at one end of its linear element 2 elongated like a thread strip and a head 4 at the other end.

The head 4 comprises: a tip 5 having a gill-shaped or wrapper-shaped engage claw 8; a pharynx 6 having a mountain- or fork-shaped cross section; and a round-bar shaped barrel 7.

Figure 2:
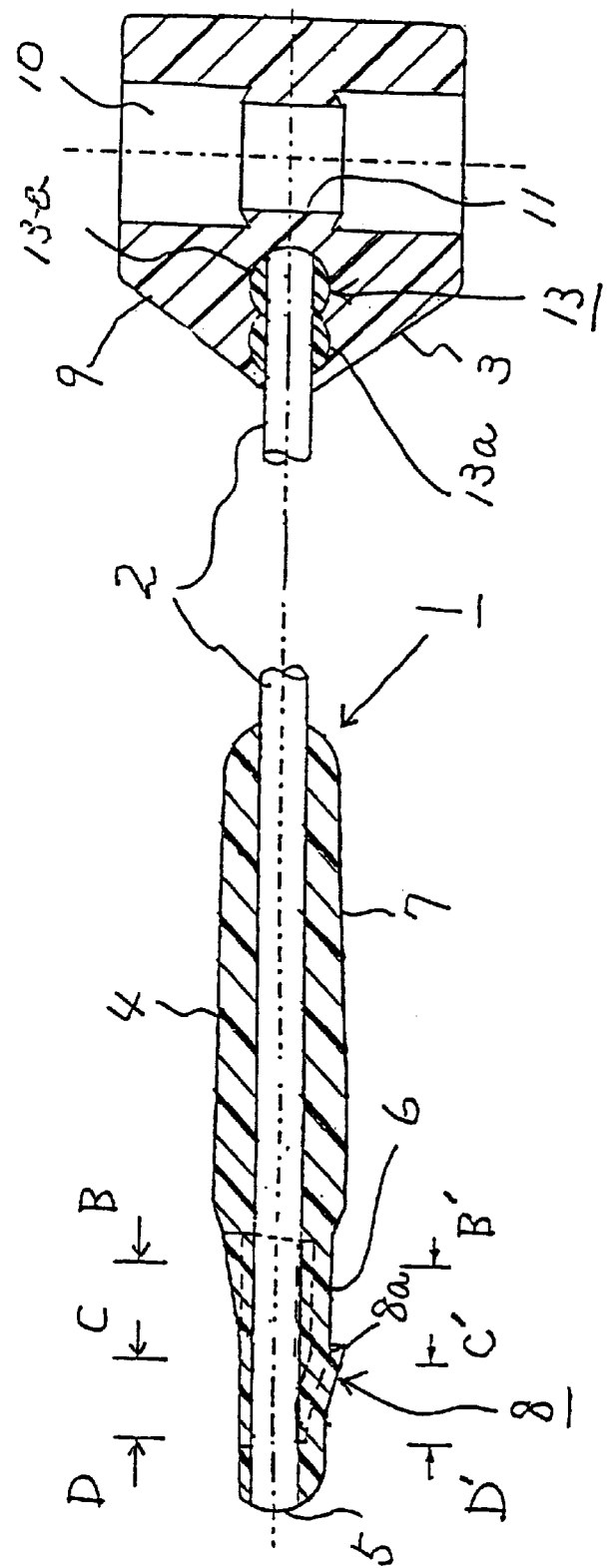
FIG. 2 is a cross-sectional view taken along line A–A' of FIG. 1.
Figure 3:
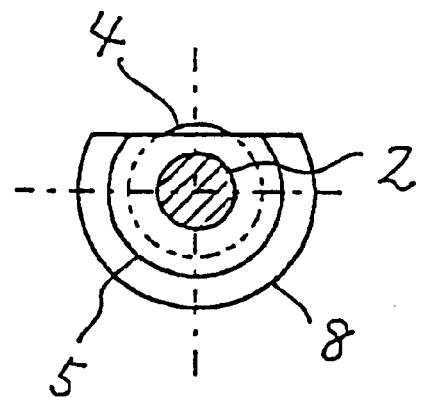
FIG. 3 is a front view of the sealing tool of FIG. 1.
Figure 4:
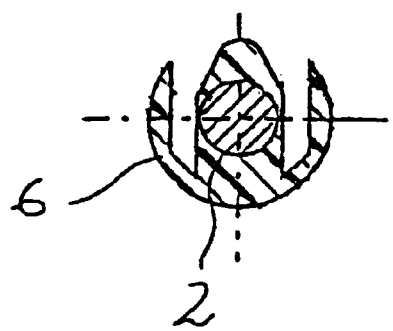
FIG. 4 is a cross-sectional view taken along line B–B' of FIG. 2.

As shown in FIG. 2, the socket 3 has a head-insertion hole 10 in the home-base shaped body 9. An annular protrusion 11 having a smaller diameter than the head-insertion hole 10 is provided at the middle thereof. This head-insertion hole 10 is provided in such a direction as to intersect the linear element 2.

Figure 5:
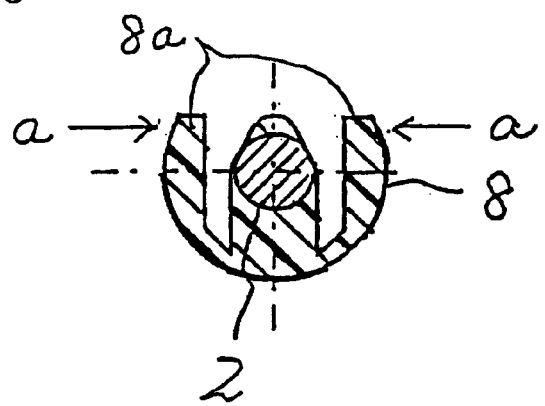
FIG. 5 is a cross-sectional view taken along line C–C' of FIG. 2.
Figure 6:
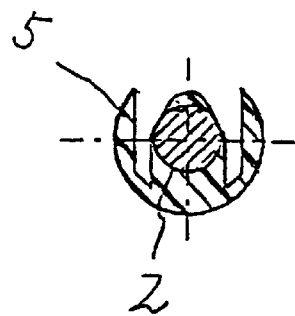
FIG. 6 is a cross-sectional view taken along line D–D' of FIG. 2.

The engage claw 8 of the head 4, when passing through the protrusion 11 in the head-insertion hole 10, narrows at the free end 8a thereof in an arrow (a) direction (see FIG. 5). However, when passing the protrusion 11, it returns to the initial state thereof, thus preventing the head 4 from going out of the head-insertion hole 10 of the socket 3.

In this sealing tool 1, a core ball 13 fixed to the tip of the linear element 2 is included or integrated in the socket body 9, so that the tip of the linear element 2 does not protrude into the head-insertion hole 10 of the socket 3, particularly into the protrusion 11. The core ball 13 may come in a single discrete type or a sequential type comprising two or more of the core balls. In the case of a sequential type, a core ball at the top is utilized as a core-ball stopping member 13b, thus preventing the inner core balls 13a from falling out.

Preferably, the head 4, the socket 3, and the core ball 13 are made of, e.g., such thermoplastic synthetic resin as polyester, nylon.

The linear element 2, on the other hand, is preferably made of a thread strip formed with such a fiber as a natural fiber or synthetic fiber, a metal fine wire formed with such metal as steel or stainless steel, an elastic thread formed with heat-resistant rubber, or a mono-linear element formed with such thermoplastic synthetic resin as polyester or nylon.

The following will describe a method for manufacturing the above mentioned sealing tool.

Figure 7:
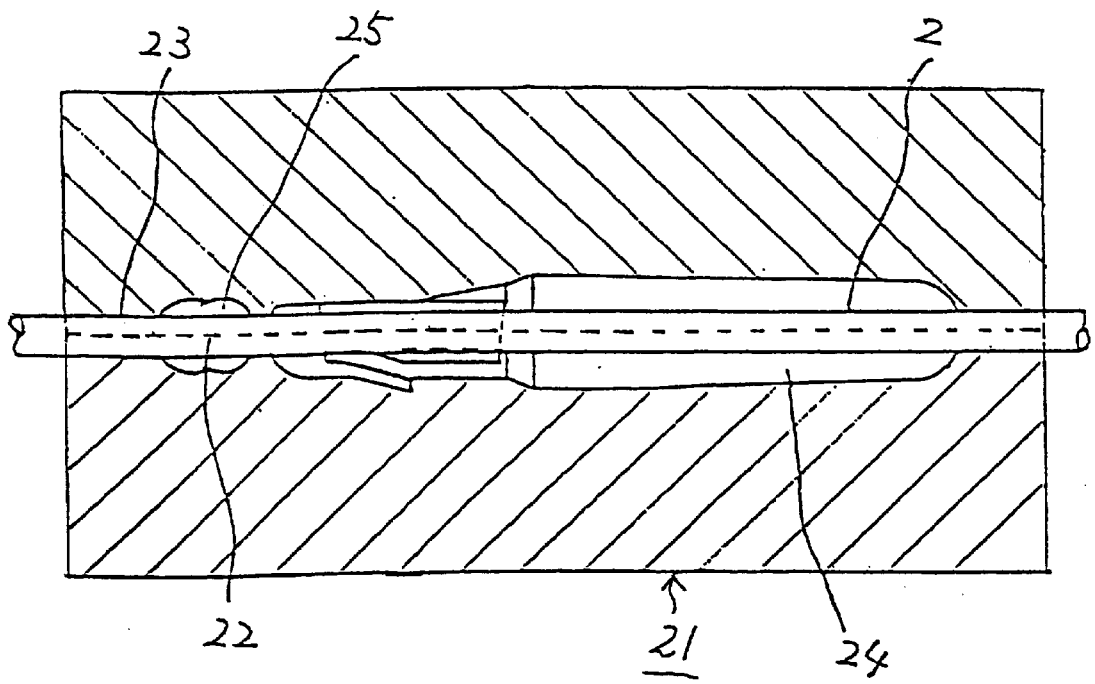
FIG. 7 is an illustration showing a state where a linear element is set in a first metal mod.
Figure 8:
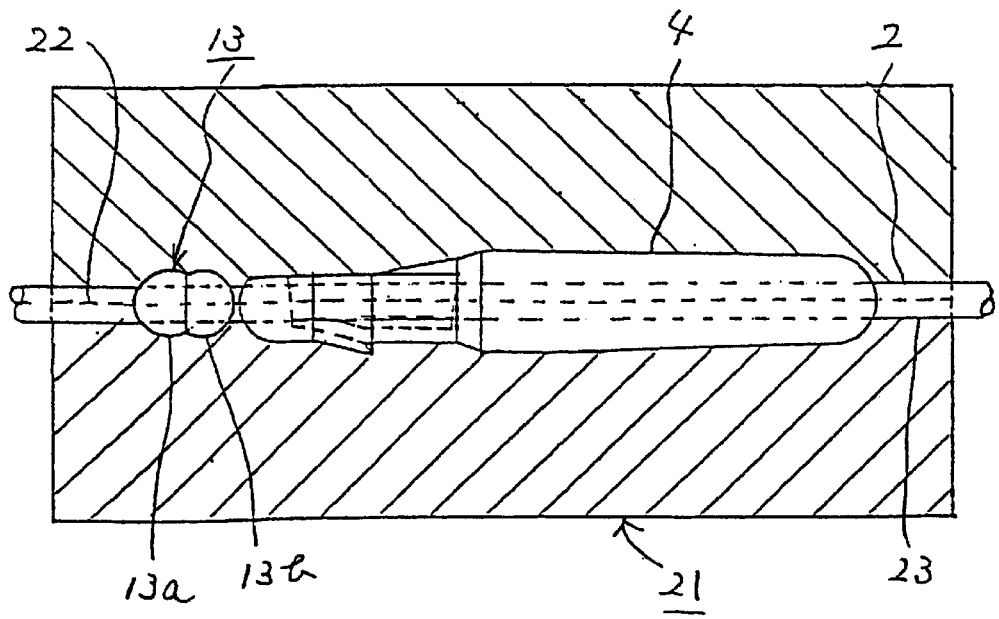
FIG. 8 is an illustration showing a head and a core ball which are injection-molded.

As shown in FIG. 7, the linear element 2 as drawed out of a reel (not shown) is set under tension into a straight groove 23 formed on a junction face 22 of a multi-division type first mold 21, then thermoplastic synthetic resin is injected into both a head-molding cavity 24 and a core-ball molding cavity 25. With this, as shown in FIG. 8, the head 4 and the sequential two core balls 13 are molded simultaneously.

Figure 9:
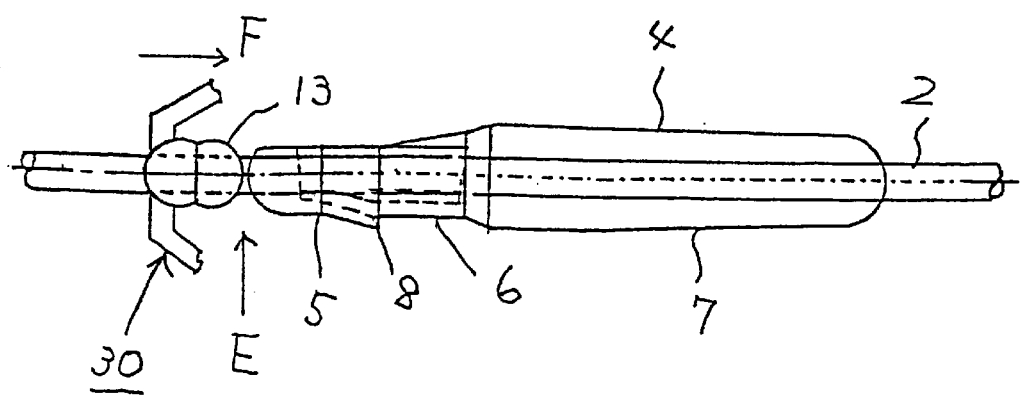
FIG. 9 is an illustration showing a state where the head and the core ball are fixed in a rosary-ball shape to the linear element.

As shown in FIG. 9, when the linear element 2 is taken out of the first mold 21, the head 4 and the core balls 13 are securely fixed to the linear element 2, so that the core balls 13 is gripped with a gripping portion 30 of a carrier robot and the linear element 2 is cut off with a cutter or any other cutting means (not shown) between the core ball 13 and the head 4 (see an arrow E). In this case, it is important to cut the linear element 2 at the position where it comes close to the core balls as much as possible and the tip of the linear element 2 may not protrude out of the core balls 13.

Figure 10:
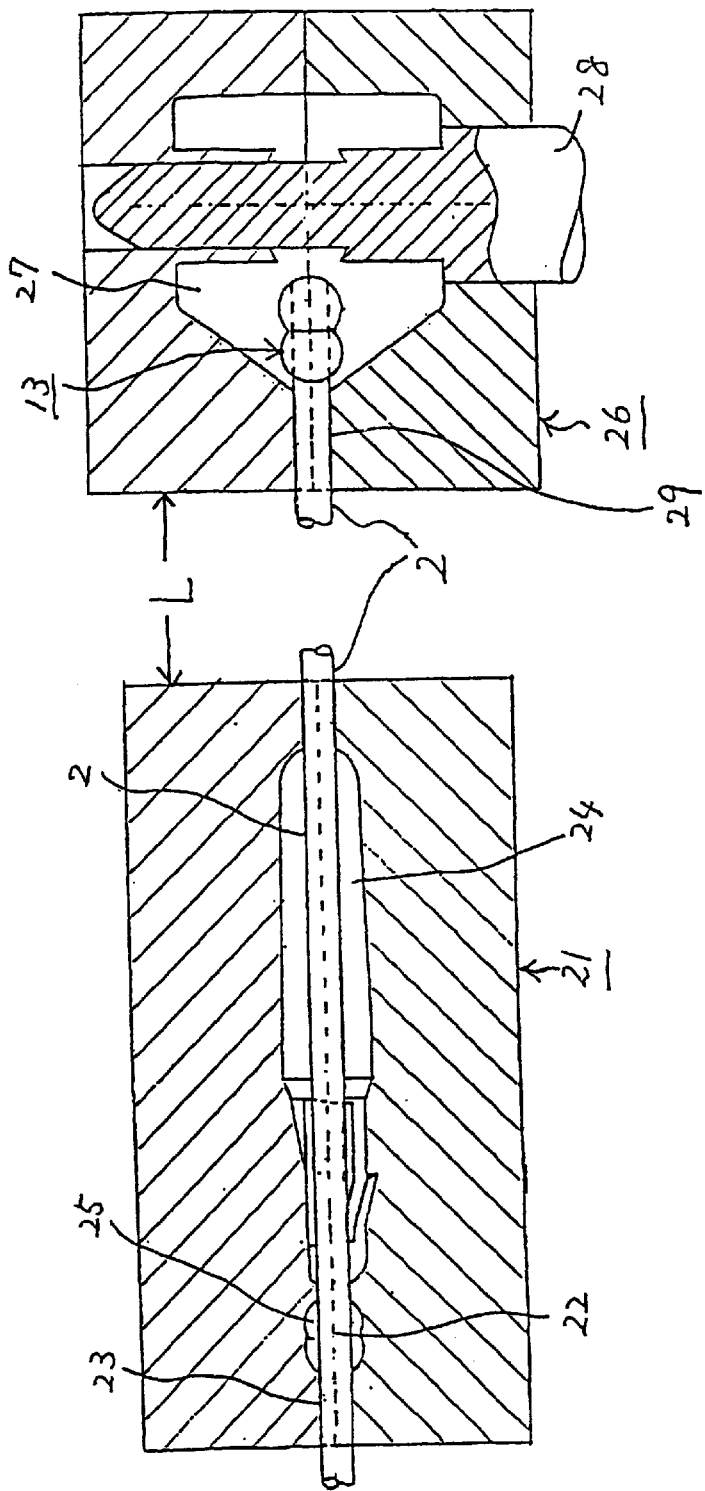
FIG. 10 is an illustration showing a state where the ball is set in a second mold and the linear element, in the first mold.

Next, while drawing out the linear element 2 from the reel (not shown) by moving in an F arrow direction the gripping portion 30 of the carrier robot which grips the core balls 13, as shown in FIG. 10, the core balls 13 are set in a socket-molding cavity 27 of the second mold 26 and, at the same time, the linear element 2 connected to the core balls 13 is set under tension into the groove 23 of the first mold 21.

Since a spacing L between the first mold 21 and the second mold 26 is adjusted at a predetermined dimension beforehand, after the core balls 13 are set in the socket-molding cavity 27 of the second mold 26, when the linear element 2 is set under tension in the groove 23 of the first mold 21, a distance between the socket 3 and the head 4 can be set at a predetermined dimension.

Figure 11:
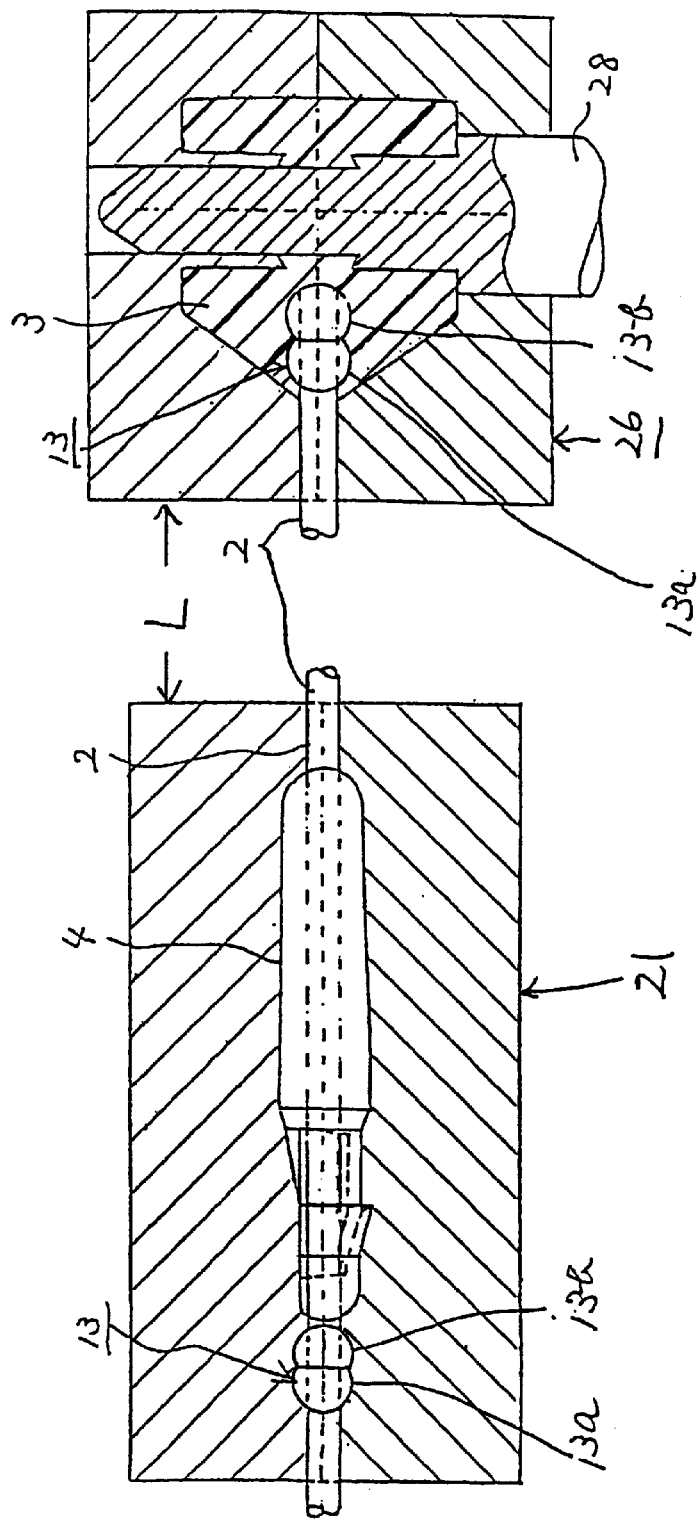
FIG. 11 is an illustration showing a state where the socket, the head, and the core ball are injection-molded.

Next, thermoplastic synthetic resin is injected respectively into the above-mentioned cavities 24, 25, and 27, then molding the socket 3, the head 4, and the core balls 13 as shown in FIG. 11. Note here that by pushing up a piston 28 incorporated in the second mold 27, the socket 3 can be easily taken out of the second mold 26.

By repeating the above operations of FIGS. 9 through 11, such a sealing tool 1 as shown in FIG. 1 can be molded efficiently.

According to the present invention, for example after molding the core ball 13 and the socket 3 with core-ball and socket molding molds the core balls 13 is set into a head-molding mold, thus the sealing tool 1 which includes the core balls 13 in the head 4 is capable of molding.

Moreover, the socket 3 and the head 4 may, different from the above-mentioned shapes, be formed flat overall as a hook, providing one portion strip with a hole having a protrusion and the other portion strip with an engagement claw for coupling with the protrusion. In short, when the engagement claw provided at one portion strip would be coupled with the protrusion in the hole of the other portion strip, it may not be released preferably.

As described above, according to the present invention, after core balls and either one of a socket or a head are fixed to a linear element, the linear element is cut at a position where it comes close to the core ball, to set the core balls in a cavity while drawing the linear element out of a reel etc. by gripping the core balls gripped with a gripping portion of a carrier robot etc. and then fill the cavity with synthetic resin, to double-mold a member (e.g., a socket in the case where the core balls and the head are molded simultaneously) connectable with another member molded together with the core balls so that the former member may include the core balls, thus preventing the linear element from protruding into the head-insertion hole. Consequently, it is possible to manufacture a high-quality sealing tool efficiently.

Moreover, according to the present invention, a plurality of core balls are fixed to the one end of the linear element and the core ball at the top may act as a member for stopping the other core balls from being extracted, thus preventing them from falling out.

Further also, according to the present invention, the core ball is utilized as a gripped portion of a linear element-draw-out means, thus making it possible to automatically move the core ball into the socket- or head-molding cavity.

What is claimed is:

1. A method for manufacturing a sealing tool which has respectively a socket at one end of a linear element and a head at the other end thereof and also which is provided with a protrusion for engaging said head of a head-insertion hole in said socket, said method comprising the steps of:

fixing a core ball and either one of said socket or said head to said linear element;

cutting off said linear element at a position where said linear element comes close to said core ball;

setting said core ball into a cavity while drawing out said linear element;

filling said cavity with synthetic resin;

and double-molding a first member connectable with a second member molded together with said core ball in such a manner that said first member may include said core ball.

2. The method for manufacturing a sealing tool according to claim 1, wherein a plurality of core balls is fixed to one end of said linear element and a core ball positioned at a top may act as a member for preventing said core balls from falling out.

3. The method for manufacturing a sealing tool according to claim 1 or 2, wherein said core ball is utilized as a gripped portion of means for drawing out said linear element.

* * * * *